United States Patent [19]

Dolan

[11] Patent Number: 5,148,015

[45] Date of Patent: Sep. 15, 1992

[54] TOUCH SWITCH INPUT DEVICE FOR COMPUTER SYSTEM

[75] Inventor: Donald T. Dolan, Ridgefield, Conn.

[73] Assignee: Pitney Bowes Inc., Stamford, Conn.

[21] Appl. No.: 633,724

[22] Filed: Dec. 24, 1990

[51] Int. Cl.⁵ ............................................. G01V 9/04
[52] U.S. Cl. ...................................... 250/221; 341/31
[58] Field of Search ................... 250/221, 229; 341/31

[56] References Cited

U.S. PATENT DOCUMENTS 4,340,813  7/1982  Sauer ................................. 250/221
4,812,833  3/1989  Shimauchi ............................ 341/31

FOREIGN PATENT DOCUMENTS 8504295  9/1985  European Pat. Off. ............. 341/31

Primary Examiner—David C. Nelms
Assistant Examiner—Stephone B. Allen
Attorney, Agent, or Firm—Charles G. Parks, Jr.; David E. Pitchenik; Melvin J. Scolnick

[57] ABSTRACT

A computerized system for displaying menu selections, and a touch switch comprising an array of reflective sensors paralleling the menu selections for highlighting a menu choice in response to a user touch, cooperating with a spacebar type switch paralleling the array for depression by the user to execute the highlighted function.

10 Claims, 2 Drawing Sheets

TOUCH SWITCH INPUT DEVICE FOR COMPUTER SYSTEM

RELATED APPLICATIONS

1. U.S. Pat. application Ser. No. 291,092, filed Dec. 28, 1988, now U.S.. Pat. No. 4,924,106, entitled ENVELOPE FLAP PROFILING APPARATUS.
2. U.S. Pat. application Ser. No. 291,473, filed Dec. 28, 1988, now U.S. Pat. No. 4,886,976, entitled DRIVER CIRCUITRY FOR MULTIPLE SENSORS.

BACKGROUND OF INVENTION

This invention relates to a computer controlled system, and in particular to a touch switch for use with a computer controlled system.

It is common in the use of computers for many application programs to make available to the user a series of menus which enable him to make selections of particular functions that he desires the computer to perform. In a typical application involving a menu, a plurality of choices with labels are displayed on the computer monitor. By default, usually one of the choices is highlighted, typically by reverse video. The user can then operate the cursor keys to move the highlighting of the menu items. When the arrives at the choice the desires to make, meaning that that particular menu item is highlighted, the then presses the keyboard enter switch in order to execute the function indicated by the label on the selected choice.

There are many other situations in which the operator, for example, of a machine has available a display which provides the operator with selections to be made. One example is a mailing machine, in which the operator can place the machine in different modes by executing a menu choice from a keyboard in a manner similar to that described above for a personal computer.

Touch screens are also commonly used in the art as a convenient way for a user to make a function selection. In one popular form, a series of electrical or optical switches are built into the front plate of a display. When the menu is displayed, the user merely has to reach up and touch the screen over the function choice that the desires. His finger or any other object that the user may be permitted to use is sensed optically or electrically and its location determined and processed by the computer to enable the desired function to be executed.

The foregoing systems suffer from various disadvantages. The touch screen approach is user-friendly but very expensive. It moreover has the disadvantage that the screen may be soiled by the user's touch which would interfere with the user's ability to view the display. The personal computer approach using a traditional PC keyboard has the disadvantage that the cursor keys are not directly mapped to the particular menu items. In other words, the cursor keys will simply move the highlighted area around the screen in the same way that the screen cursor is moved around, but the user must observe the display to ensure that the proper selection is highlighted before the executes the function by pressing another key on the keyboard. Moreover, for the control of the machines, for example the mailing machine previously allued to, an expensive keyboard of the type traditionally used with personal computers is unnecessary if the object is not to provide alphanumeric text but merely to simplify the task of the user to make menu selections.

SUMMARY OF THE INVENTION

An object of the invention is a relatively simple, low cost touch type keyboard which will simplify a user making a particular choice form a variety of displayed selections.

Another object of the invention is a touch type keyboard for use with a computerized system capable of displaying an array of menu choices, with keyboard constructed to map the positions for the user to place his finger or an object to the display of menu choices on a monitor.

These and other features and advantages of the invention are achieved, briefly speaking, with a novel, low cost combined optical and electrical switch for use with a computer controlled display in which the menu choices displayed on eh screen are mapped to switch positions making it extremely easy for the user to make his selection.

In accordance with a feature of the invention, the combined optical electrical switch comprises an extended member associated with an electrical switch. Associated with that extended electrical switch are a plurality of optical sensors. Each to the sensor are electrically connected to the computer, as is the electrical switch. The plurality of sensor extend parallel the elongated member or adjacent thereto or are integrated therewith such that when the user places his finger or an object over a sensor in order to make a selection, that same finger will be positioned over the elongated bar which will enable him to active the electrical switch.

In accordance with a further feature of the invention, the elongated member comprises a straight bar of a length that corresponds to the width to the display, and is preferably mounted under the display and parallel to it. The sensors in turn are arrayed in a line parallel to the straight bar. The straight bar constitutes a single electrical switch which can be activated by the user depressing the bar anywhere along its length. The display is arranged so that the menu choices extend in one or more lines parallel to the straight bar. The menu items displayed are substantially aligned each with one of the sensors it eh array. As a result, when the user places his finger over a particular sensor, big finger will be aligned with a displayed menu choice. In addition, it is preferred that a cursor be displayed on the screen that follows the position the finger of the user on the sensor array. Conventional circuitry can be provided for accomplishing the foregoing. In other words, each time the user presses his finger over a sensor, conventional circuitry is activated to display a cursor on the screen in line with the chosen sensor.

In a further preferred embodiment, each time that the user presses his finger or an object over a particular sensor, where a menu item is aligned with or associated with that particular sensor, then the menu item on the display becomes highlighted. Again, conventional circuitry can be used to implement the foregoing function.

In accordance with a further aspect of the invention, the sensors comprise reflective type sensors. These are known off-the-shelf conventional devices which comprises, side-by-side, an LED emitter and a photodetector, typically a phototransistor. Both the LED and the photodetector face in the same direction. The LED is typically pulsed continuously to constantly emit radiation away from the device. Under normal circumstances, little if any of that radiation is reflected back to the photodetector which therefore remains in its unactivated state. When a user places a finger or other object over the sensor, some of that radiation is reflected by the finger or by the object back toward the photodetector which will then be triggered into its activated state, and that action will create an electrical signal that can be processed in the manner above described. These commercial reflective sensors are very small and thus it is readily simple to embed a line of such sensors in a suitable transparent housing which will allow the radiation to pass out and when reflected back in to activate the detector.

These and other features and advantages of the invention will be best understood from the following detailed description of several embodiments of the invention taken in connection with the accompanied drawings.

DETAILED DESCRIPTION OF PREFERRED EMBODIMENTS

Figure 1:
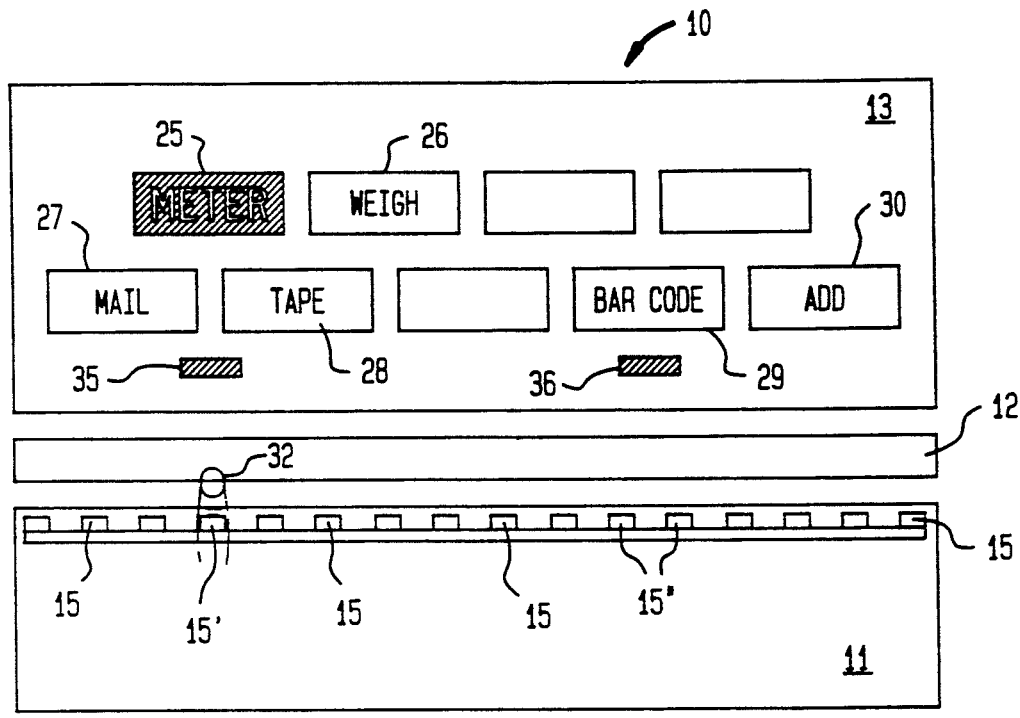
FIG. 1 is a front elevational view of one form of computerized system with the improved touch type switch of the invention.

FIG. 1 illustrates one embodiment of the computerized system in accordance with the invention. It comprises a base or console unit 11, an elongated bar switch 12 positioned directly above the console 11 and a conventional display device 13. The display device 13 is shown in a form of a panel, such as an LCD or a plasma display panel. Alternatively, it can be the screen of a CRT of the type conventionally used with personal computers.

The bar switch 12 is constructed so that when it is pressed anywhere along its length it closes a single switch. Embedded in the console unit 11 is an array, in this instance configured as a straight line, of a plurality of reflective sensors 15. The line of sensors shown horizontal in FIG. 1 is parallel to the axis in its length direction of the bar 12.

Figure 3:
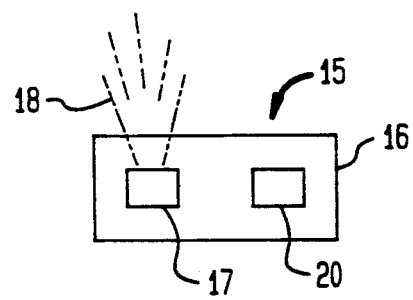
FIG. 3 is a detailed view of one of the sensors, viewed from the top, that can be used in the touch switch of the FIG. 1 embodiment.

Each of the sensors 15 is an off-the-shelf sensor of the reflective type comprising side-by-side emitters and detectors both of which face in the same direction. FIG. 3 is a schematic view from the front of one of those sensors 15. It comprises a small package 16 having on its interior on its left side an infrared LED which emits infrared radiation through an active window 17 of the package. The radiation is referred to by reference numeral 18. Located next to the emitter window 17 is the active window 20 of a photodetector also inside the package but on its right side. Conventionally, this is a phototransistor. A more complete description of these conventional reflective sensors and how they are operated and used can be found in the related applications referenced above, U.S. Pat. Nos. 4,924,106 and 4,886,976, whose contents are hereby incorporated by reference. The view in FIG. 3 is enlarged; these reflective sensors typically have width dimensions (the horizontal dimension in FIG. 3) of about three-eights inches. The geometry is such that whenever an object is placed over the window 17 of the emitter the radiation 18 is reflected and impinges on the adjacent photodetector 20 which is sufficiently sensitive to respond by generating an electrical signal which can be processed to perform any desired function.

If the system 10 of FIG. 1 were part of a personal computer, then it would be a stand-alone system for use for example on a desk top. If the system FIG. 10 were intended as an operating panel for a machine, then it would be mounted at a convenient Plate on the machine housing at eye level to simplify use by a user. In either event, the arrangement of the display 13 and the bar switch 12 and the line of sensors 15 is fixed relative to one another. This has been indicated schematically in FIG. 2 by the dashed mounting plate 22. The sensor or display housing or at least that part of the housing for the console where the sensor is present, is constituted of a visible-light-opaque but infrared-transparent material. Such materials which are typically constituted of black plastic are readily commercially available. The object is to block ambient light from triggering the detector but to allow infrared radiation from the emitter to pass in and out of at least that part of the housing which overlies the windows 17 and 20.

The system is operated by programming the particular application so that menu choices in the form of suitable objects, such as icons or text, are displayed along one or more horizontal lines which extend parallel to the parallel lines defined by the bar switch 12 and sensor line 15. FIG. 1 displays a typical menu that would be suitable for a mailing machine application where the user can place the machine into different modes by executing certain functions. For example, the available choices for this mailing machine is to use the meter to apply postage to a mailpiece, or to weigh the mailpiece, or to process the mailpiece, or to generate the postage on tape to be applied to the mailpiece, or to place the machine in a mode that it can read a bar coded message on an envelope, or just for the purpose of carrying out certain additions. The possible choices as will be observed are aligned in two horizontal lines on the display. Each of the items to be chosen are identified by a suitable label and each of them is substantially vertically aligned with at least one of the sensors located below in the console. For example, the Meter choice 25 is aligned with the sensor referenced 15'. The Bar Code selection 29 is aligned with each of two sensors 15". As is typical in such menu driven applications, the choice to be made by the user is highlighted, typically by reverse video. FIG. 1 shows that the Meter label 25 is in reverse video indicating that when the user decides to execute that particular function, he must operate a switch.

In accordance with the invention, the array of sensors 15 are used to generate signals which control the display and which highlight particular menu items depending upon which sensor is activated. So, as indicated in FIG. 1, the user has placed his finger shown diagrammatically at 32 over the sensor 15' which has activated the photodetector and the resultant electrical signal processed to cause the Meter selection 25 to be highlighted. If now the user moves his finger to either of the sensors 15", then the Bar Code selection 29 will become highlighted, and the highlighting at the Meter selection 25 will disappear. The electrical circuitry for implementing this is straightforward and simply requires a microprocessor or like CPU to sense which of the sensors has been activated and then through an appropriate program carry out the highlighting. Practically all application programs nowadays provide such a feature in their software.

The highlighting of the desired selection by the user placing his finger over a reflective sensor lined up with the displayed item will normally be sufficient to inform the user of the choice that the has elected. It is however preferred that a cursor be displayed on the display 13. This is illustrated by the hatched rectangle 35 on the display. It will be observed that the cursor 35 is vertically aligned with the highlighted menu choice and also with the sensor over which the user placed his finger. In this particular system, which is not intended to be limiting, the cursor moves horizontally only, so if the user moves his finger to the right over one of the sensors 15" then the cursor 35 will follow the position of his fingers and occupy the position designated by reference numeral 36 which would then be aligned with the Bar Code selection.

Figure 2:
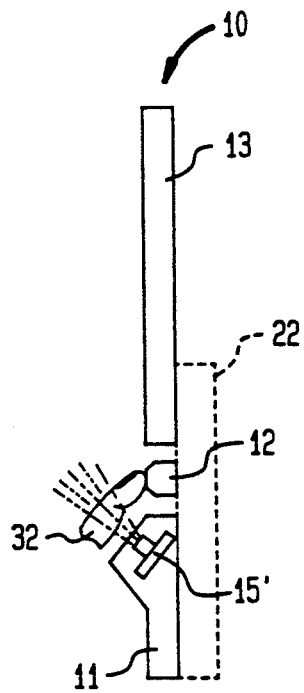
FIG. 2 is a side view of the system illustrated in FIG. 1.

The spacing of the bar 12 and the line of sensors 15 is such that when the finger of the user is over a sensor 15, it will also be over the bar 12. This is illustrated in FIG. 2. As will be observed, the placing of the user's finger over a particular sensor also allows the finger tip to be positioned over the bar 12. Simply by pressing the bar 12 the desired function can be executed, in the same manner that one typically executes a menu choice in a personal computer by pressing the enter key.

The system of the invention as described has a number of advantages. First, the cost of such a system is relatively small. The sensors themselves are relatively inexpensive and the bar 12 is equally inexpensive inasmuch as it only contains a single electrical switch. Second, the system is very flexible. By providing a series of sensors in a console, for example 16 sensors, then the sensor resolution allows for displaying different sizes and numbers of menu items. Depending upon the size of the screen, these can be arrayed in single line parallel to the line of sensors, or in several lines. The third important advantage is that the position of the finger is aligned with the position of the menu item on the display which makes it very simple for the user to quickly make a choice by placing his finger or any other object over the sensor that is located underneath the menu item the decides to choose. Moreover, the does not have to move his hand or his finger to execute the choice he has made. Once the chosen menu item has been highlighted, all that the user has to do is press down with his finger on the bar 12 to execute the function indicated by the menu item. Thus excellent tactile feedback to the user is present. The result is a very low cost combined optical and electrical switching system for use in a computerized system for executing function choices available with that system.

Figure 4:
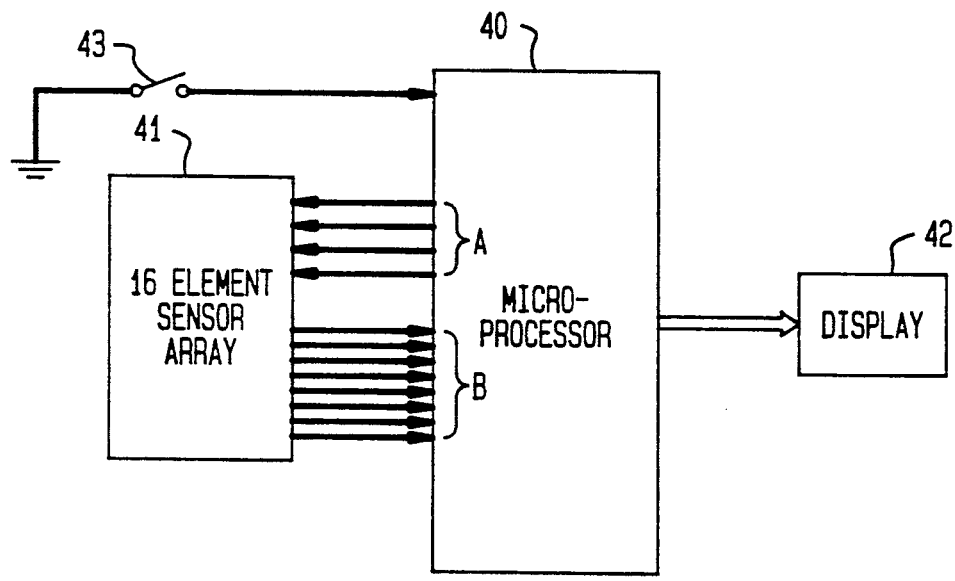
FIG. 4 is a schematic block diagram of one form of electrical circuitry for use with the system illustrated in FIG. 1.

The system circuitry to implement the invention is straightforward and is fundamentally no different from that employed in personal computers with a traditional keyboard. This is indicated in FIG. 4, which shows a block diagram of the system. The heart of the system is a conventional microprocessor or other CPU 40. The sensor array is arranged in a matrix, which can be of the type disclosed in the referenced related applications. Assuming 16 sensors are present in the system, they can be conveniently arranged in a 4×4 matrix. The microprocessor 40 would be provided with two sets of input /output lines labeled A and B in FIG. 4. As described in the referenced applications, the A lines would be four source lines to the sensors, and the B lines would consist of four sine and four data lines. In a conventional manner, the microprocessor can be readily programmed to scan each sensor in the array via a polling technique on a regular basis to detect the presence of an electrical signal as a result of the photodetector picking up reflected radiation from its adjacent emitter. Alternatively, it is of course possible to use a microprocessor with an interrupt system programmed such that each time an electrical signal is generated by one of the photodetectors it causes an interrupt in the microprocessor and the microprocessor then branches to a routine to service the interrupt. The microprocessor knowing from the interrupt which of the 16 elements of the sensor array were activated would be able to activate the appropriate circuitry to position the cursor on the display 42 to which it is connected. As previously mentioned, it can also simultaneously highlight the selected menu item. As already mentioned, this system circuitry is fundamentally similar to the keyboard circuitry now used in conventional personal computers to identify keypresses and execute the function associated with the particular key pressed.

In addition, there would be another input to the microprocessor from a switch 43 representing the bar switch 12. In other words, whenever the bar switch 12 is depressed, it would be the equivalent of switch 43 closing and causing an interrupt which the microprocessor can recognize and process.

Those skilled in the art will recognize that there are many computer alternatives to accomplish the same set of functions required as described above, namely, to recognize which of the sensors has been activated, and then to take the appropriate program action when the switch bar is also activated.

Figure 5:
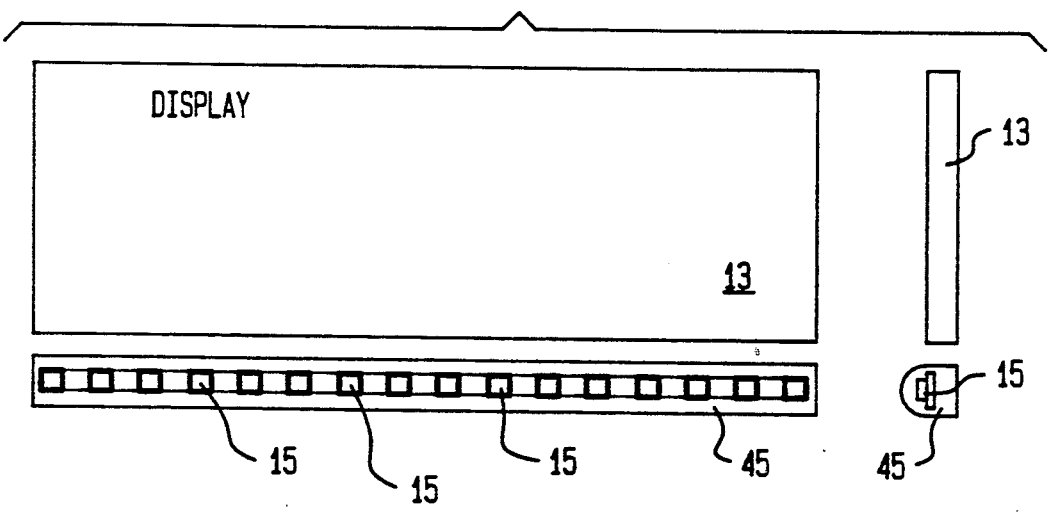
FIG. 5 is a front elevational view of a modification of the system according to the invention.

In the embodiment so far described, the array of sensors is located physically separate from but adjacent to the bar switch so that the same user's finger can activate both. In the embodiment now to be described, the array of sensors is embedded in the bar switch itself. This is illustrated in a front view in FIG. 5. Similar reference numerals are employed to identify similar elements. In this case, the bar switch is represented by reference numeral 45 within which is mounted a row of sensors 15. As before, the front panel of the switch housing would be constructed of visibly-opaque but infrared-transparent material to allow the infrared radiation to pass in and out of the bar 45. Otherwise, the operation would be identical to that described in connection with the FIG. 1 embodiment. The advantages of this alternative embodiment is that the detection can be made more consistent since the spacing from the sensor to the finger is determined by the switch bar geometry, and the spacing can be optimized for maximum sensor output. Moreover, the combined or integrated bar switch and sensor array is more compact and requires less space. Still further, no penalty for optimum spacing to obtain optimum resolution need be realized.

It will be recognized from the foregoing description that the bar switch 12, 45 corresponds in electrical function and to a certain extent in appearance to the conventional spacebar on a conventional personal computer keyboard. Moreover, it can function and be connected circuitwise in the same manner as the spacebar.

It will also be recognized that one of the advantages of the system is that there is, surprisingly, sufficient reflection from a user's finger to activate the sensors.

Thus, it is possible for the sensors to be located a reasonable distance behind the front plate of its housing and yet to respond adequately. A suitable spacing is for example about one-quarter inches. Moreover, the user can either pass his finger along the array at a slight spacing or actually place it on the bar and lightly move his finger across the array. Thus, there will be a continuous detection of finger position by each of the sensors as the finger passes sequentially over the sensors and it will cause the displayed cursor to follow the movement of the finger and will correspondingly cause the various menu items to be highlighted in sequence.

It will also be recognized that it is not necessary to use a finger to activate the system. Most any kind of an object held by the user, such as a pen or pencil, which when passed over the sensor array will provide usually sufficient reflective radiation to the photodetector to activate the sensors. The system of the invention is especially beneficial for machine control and operation, such as the mailing machine application previously described. Such machines require typically a less sophisticated keyboard than does a typical personal computer, and only a limited number of switch positions which are the equivalent of keypresses are required to control the operations of the machine.

While the invention has been described and illustrated in connection with preferred embodiments, many variations and modifications as will be evident to those skilled in this art may be made therein without departing from the spirit of the invention, and the invention as set forth in the appended claims is thus not to be limited to the precise details of construction set forth above as such variations and modifications are intended to be included within the scope of the appended claims.

What is claimed is:

1. In a computerized system having a monitor, first means for displaying on the monitor plural items each representing one of a plurality of functions to be executed by the computer, second means in response to a user-generated selection signal to indicate on the monitor a selection of a particular function desired to be made by the user, and third means in response to a user-generated execution signal to execute the selected function;
    the improvement comprising means in response to a user's object's touch to generate both the selection and execution signals, said means comprising:
    (a) a plurality of optical sensors, each of said sensors comprising a radiation emitter and an adjacent radiation detector positioned to receive and detect radiation generated by the emitter and reflected from a user's object's touch for generating said selection signal,
    (b) switch means having actuation member responsive to actuation by the user for generating said execution signal, said actuation member being positioned such that it can be actuated by the user to generate said execution signal by the same object touch that generates the selection signal.

2. The system of claim 1, wherein said actuation member comprises a rigid elongated bar such that actuation anywhere along its length operates the switch means.

3. The system of claim 2, wherein the optical sensors are arrayed in a line extending parallel to the length direction of the elongated bar.

4. The system of claim 3, wherein the line of sensors is adjacent but closely spaced to the elongated bar.

5. The system of claim 3, wherein the line of sensors is embedded in the switch means beneath the actuating member.

6. The system of claim 1, wherein the sensors each comprise, side-by-side, an LED emitter and a photodetector.

7. The system of claim 6, wherein each LED emitter and each photo-detector has an active window, said windows facing in the same direction.

8. A combined electrical-optical touch switch, comprising:
    (a) an elongated member having a single elongated actuation part and an electrical switch connected to the actuation part such that movement of any portion of the actuation part will cause the electrical switch to change state,
    (b) a line of adjacent touch sensors each comprising a radiation emitter and a radiation detector,
    (c) said line of touch sensors being positioned relative to the elongated member such that when a user places an object on the elongated member at a selected position overlying one of the sensors to make a selection, the output of the underlying detector changes sufficiently to detect the object while simultaneously the user can actuate the electrical switch with the same object and without laterally displacing the object.

9. The switch of claim 8, wherein the touch sensors each comprise, side-by-side, a light emitter and a light detector.

10. The switch of claim 9, wherein the light infrared radiation.

* * * * *